United States Patent Office 3,441,246
Patented Apr. 29, 1969

3,441,246
ELECTROMAGNETIC VALVE
Heinz Lauppe, Flensburg, and Dieter Westphal, Flensburg-Murwik, Germany, assignors to Danfoss A/S, Nordborg, Denmark, a company of Denmark
Filed July 20, 1966, Ser. No. 566,546
Claims priority, application Germany, July 24, 1965, D 47,824
Int. Cl. F16k 1/36, 31/04
U.S. Cl. 251—52                    6 Claims

ABSTRACT OF THE DISCLOSURE

A valve for controlling flow of a fluid under pressure having a compartment defined by a flexible wall connected to the valve stem and without apertures. Some of the working or controlled fluid under pressure is received in the compartment through an axial passage in the valve stem for applying pressure to the flexible wall in a direction toward seating the valve element and acting to damp the valve openings and closings thereby avoiding use of a damping fluid other than the fluid controlled by the valve. Two springs further damp valve oscillations and a spring force differential is applied in the direction of seating the valve.

---

Figure 1:
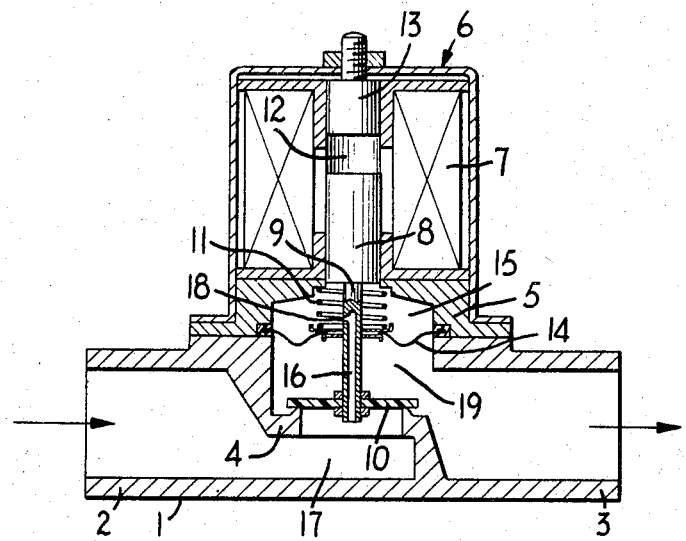

This invention relates generally to valves and more particularly to a new and improved electromagnetic valve.

Known electromagnetic valves have a damping system in which a fluid is used to dampen the valve. Generally the damping system is filled with a fluid which is different from the fluid being controlled or regulated by the valve. This requires that the damping system be fluid-tight to maintain the fluid separate from the medium flowing through the valves in order to avoid contamination of the controlled fluid with the damping system fluid.

Electromagnetic valves are known in which the damping is accomplished pneumatically. In these known valves it sometimes occurs that the system will develop accoustic disturbing oscillations which are in phase, and about the same frequency, with the frequency of the current applied to the operating coil of the electromagnetic valve so that the disturbing oscillations can not be dampened. The inability of the damping systems to damp out oscillations results in valve chatter and noisy operation as well as inaccurate control.

The known valves also have a problem in that equalization of inlet and outlet pressure to substantially balance pressures on opposite sides of the valve disc presents a relatively serious problem. The absence of balancing of pressures on opposite sides of the valve disc results in a pressure differential necessitating that greater actuating power be built into the actuator of the valve thereby requiring a larger energizing coil or operating coil for opening and closing the valve.

It is a principal object of the present invention to provide a new and improved electromagnetic valve eliminating the above-mentioned problems or limitations of known electromagnetic valves.

A feature of electromagnetic valves in accordance with the invention is the provision of a control passage through a valve stem which operably connects the valve disc to an automatic electromagnetic actuator. This passage is provided with a restriction or control orifice through which fluid being controlled by the valve is allowed to enter from the valve inlet into a compartment partially defined by a flexible wall connected to the valve stem. Pressure variations in the interior of this compartment result in entry or displacement of fluid from the compartment which is throttled through the control orifice and allows smooth and controlled movement of the valve stem and valve disc without chatter.

The use of the fluid being controlled by the valve as the damping medium avoids the necessity of providing a separate fluid and the necessity of maintaining a fluid-tight seal between the aforementioned compartment and the interior of the valve since there is no possibility of contamination of the controlled fluid by fluid leakage from the compartment.

The flexible wall of the compartment is constructed as a membrane connected to the operating member or valve stem for the valve disc and has an effective area under pressure substantially equal to the area under pressure of the valve disc so that the valve disc is substantially balanced thereby requiring minimum power input for automatically actuating the valve to an open and a closed position.

The electromagnetic valve actuator may have an armature therein operated by a coil and made integrally or separately from the valve stem. In a first embodiment, a compression control spring is mounted in the aforementioned compartment biasing the valve stem and therefore the valve disc to a seated position in which the valve is closed. A second embodiment makes use of two opposed springs in which a spring biasing the valve to a closed position exceeds the force of a spring biasing the valve to an open position and the use of the spring force differential in conjunction with the damping system of the invention provides for a smooth acting and accurately controlled valve. Moreover, the accurately defined differential force and the "balancing of pressure" on the valve disc allows the use of minimum force in the electromagnetic actuator or solenoid structure of the valve, according to the invention.

Figure 2:
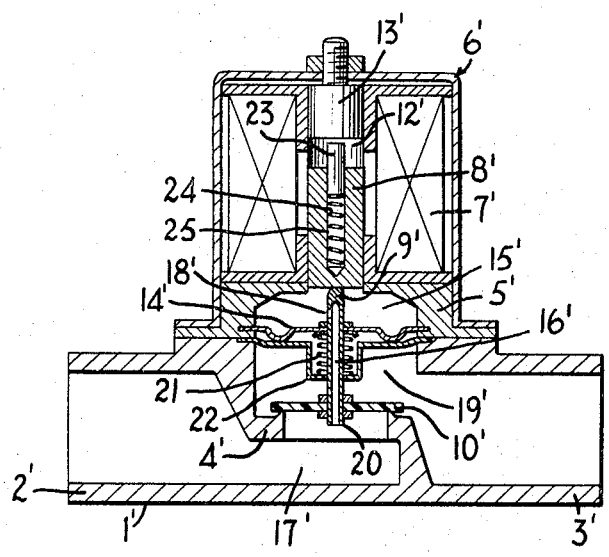

Other features and advantages of the electromagnetic valve in accordance with the present invention will be better understood as described in the following specification and appended claims, in conjunction with the following drawings in which:

FIG. 1 is a diagrammatic vertical section of an electromagnetic valve provided with a damping system in accordance with the invention; and FIG. 2 is a vertical section view of a second embodiment of a valve provided with a damping system in accordance with the invention.

As illustrated in FIG. 1, a valve body 1 is provided with an inlet portion 2 and an outlet portion 3 and a valve seat 4 therebetween. The valve is provided with a bonnet-like structure 5 on which is mounted an automatic electromagnetic or solenoid-type actuator 6 provided with an operating coil 7 electrically energized from an electrical source, not shown, for automatically actuating an armature 8 intergral with or connected with a valve stem 9 to which is secured a valve disc 10 operable to a seated or unseated position on said seat for opening and closing the valve to control flow of a fluid medium through the valve.

Provision is made in electromagnetic valves in accordance with the invention for both damping the valve and balancing the pressures of the valve element or disc by a single damping system hereinafter described.

A spring 11 is mounted circumferentially of the valve stem 9 with a fixed end thereof seated on an internal shoulder of element 5 and a free end seated on a support fixed to the valve stem so that the spring constantly biases the disc to a seated position. The spring is mounted within a compartment, as hereinafter explained, which is fluid-tight relative to external leakage. The electromagnetic actuator comprises an axial space 12 for the armature sealed at one end by a stop 13 and the opposite end of which communicates with the valve body. A flexible wall comprising a membrane 14 is secured, for flexible movement, to the valve stem and has its outer periphery stationary and in a substantially fluid-tight sealed condition with the bonnet-like portion 5 of the valve. The aforementioned structure defines a substantially enclosed and fluid-tight compartment 15 in communication, through a passage 16 in the valve stem, with the valve inlet 17. The passage 16 opens to the compartment 15 through a restricted opening 18 defining a control orifice. The compartment 15 is substantially isolated from the outlet 19 of the valve.

The space defined by the compartment 12, 15 is fluid-tight relative to external leakage. The bonnet-like structure 5 and the actuator 6 casing are fluid-tight and mounted on the valve body 1 in a fluid-tight condition.

When the electromagnetic actuator 6 is energized and deenergized, the valve will unseat and seat. The membrane or flexible wall 14 is circumferentially of the valve stem and is flexed due to travel of the valve stem thereby causing pressure changes in the compartment 15 and causing an inflow and outflow of the fluid medium to and from the compartment through the control orifice so that a damping and smooth action of the valve takes place in conjunction with controlled compression and expansion of the spring 11.

Since inflow and outflow of the fluid into the compartment and from the compartment 15 takes place only through the choke or control orifice 18, the armature is braked correspondingly and in the energized condition of the valve, the attracted state of the armature, oscillation of the armature is strongly and effectively dampened since the armature oscillations will tend to enlarge and diminish the size of the compartment 15 causing the flexure of the member 14 whereby the damping system is quite effective. Moreover, as can be seen the use of the same medium being flowed through the valve avoids any possibility of contamination of the fluid flowing through the valve which may be, for example, a gas.

The membrane 14 has an area under pressure that at least offsets the pressure of the inlet fluid applied to a corresponding area on the valve disc so that the valve is substantially "balanced" and less force is required both in seating and unseating the valve due to pressure differentials of the fluid within the valve inlet 17 and outlet 19.

A second embodiment of an electromagnetic valve provided with a damping system according to the invention is illustrated in FIG. 2, in which component parts similar to the parts of the first embodiment of the valve described have their reference numerals similar to the FIG. 1, but primed, to show the relationship between the corresponding parts.

In FIG. 2, of valve structure is as before described and the flexible wall or membrane 14' is made of a suitable flexible material which does not take a set. This is true of the aforementioned embodiment. In addition, the valve stem 9' is made separate from the armature 8'. The valve stem 9' is separate from the armature and is provided with a central bore or passage 16' opening into the compartment 15' through an opening 18' which is not a restricted orifice. In this embodiment, the restriction takes place through the bore 16' in the portion 20 of the valve stem 9'. This bore is essentially a capillary. That is to say part 20 is a capillary tube.

A first spring 21 has a free end seated on a support fixed, as shown, to the valve stem 9' and biases the valve toward an open position and has a stationary end seated in a rigid cupped member 22 through which the valve stem extends. Sufficient clearance exists between the cupped member 22 and the valve disc 10' to allow the full desired opening of the valve.

The actuators 6' of the second embodiment, armature 8' has a blind bore 25 in which is disposed slidably therein a pin 23 which extends outwardly of the bore and engages the stop 13' during upward travel of the armature to compress a spring 24 disposed in the blind bore 25.

In the second embodiment as in the first described embodiment, the membrane 14' is constructed with an area under pressure at least equal to the area in which the fluid medium acts on the valve disc 10'. Thus, the valve disc is substantially "balanced." The force of the first spring 21 is less than the force of the second spring 24 so that the valve is biased in a closed direction. When the operating coil 7' is electrically energized, by alternating current from a source not shown, the armature 8' is actuated so that the pin 23 abuts the stop 13' compressing the spring 24 and the valve disc unseats due to the "following" action of the valve stem 9' which is coaxially disposed with the armature and is in end to end abutting engagement therewith.

When the solenoid of the electromagnetic is actuated or energized, the compartment 15' is subjected to an increase in pressure due to the deflection of the membrane 14' and fluid therein tends to move through the damping system flowing outwardly therefrom so that the actuation of the valve is smooth and controlled avoiding chatter and oscillations as before described.

Those skilled in the art will appreciate that the damping system of the invention is effective to damp out oscillations of the solenoid and avoids chatter. Moreover, the use of the fluid or medium being controlled by the valve as a damping agent avoids the necessity of complex sealing arrangements interiorly of the valve to preclude contamination of the controlled medium by the damping fluid.

What we claim and desire to secure by Letters Patent is:

1. In a valve for controlling flow of a fluid under pressure therethrough, a valve body having an inlet portion and an outlet portion and a valve seat, a valve element operable to a seated position and to an unseated position on said seat to thereby close and open the valve to control flow of said fluid from said inlet portion to said outlet portion, an automatic actuator for selectively actuating said valve element to said unseated position and to said seated position, a valve stem movable axially responsive to actuation by said actuator operably connecting said actuator and said valve element, means defining a compartment in said valve comprising a flexible wall free of apertures and responsive to pressure within said compartment and connected to said valve stem for flexure upon axial travel of said valve stem, said valve having a passage providing communication between said inlet portion and said compartment effective to apply some of said fluid from said inlet portion to said compartment to effectively apply pressure to said flexible wall in a direction effective to cause said flexible wall to tend to maintain said valve element seated, whereby said flexible wall and said fluid in said compartment dampen travel of said valve element and said valve is free of a dampening fluid other than the same fluid being controlled by said valve, said flexible wall being deflectable in a direction decreasing the size of said compartment when said valve element is operated to said unseated position, said flexible wall comprising a membrane, said passage being disposed axially in said valve stem extending through said valve element and opening into said compartment, a first spring biasing said valve stem in a direction for unseating said valve element, a second spring in said actuator opposing said first spring overcoming said first spring biasing said valve stem in a direction for seating said valve element, and said membrane having an area under pressure substantially equal to an area on said valve element in contact with said fluid under pressure.

2. A valve according to claim 1, including a fixed valve seat for said first spring in said valve, and another seat for a free end of said spring fixed to said valve stem.

3. A valve according to claim 1, in which said electromagnetic actuator comprises an operating coil, an armature actuated by said coil disposed for actuating said valve stem, said second spring being disposed biasing said armature toward a position actuating said valve stem to said seated position.

4. A valve according to claim 3, in which said armature has a blind bore, said spring being disposed in said blind bore, stop means compressing said spring when said actuator is electrically energized and said valve element is unseated, said first spring being disposed effective to bias said valve stem axially into axial engagement with said armature, whereby said armature and said valve stem move axially jointly.

5. In a valve for controlling flow of a fluid under pressure therethrough, a valve body having an inlet and an outlet and a valve seat, a valve element operable to a seated position and to an unseated position on said seat to thereby close and open the valve to control flow of said fluid from said inlet to said outlet, an automatic actuator for selectively actuating said valve element to said unseated position and to said seated position, the improvement which comprises means using the fluid to be controlled by said valve to both dampen the lifting and seating of said valve element and substantially balance pressures on opposite sides of said valve element while in a seated condition and said means comprising a fluid-impervious, pressure-responsive flexible diaphragm cooperative with said fluid under control of said valve element for operating to dampen lifting and seating of said valve element.

6. In a valve according to claim 5, in which said valve element comprises a valve disc, said actuator comprises a solenoid type actuator, and in which the last mentioned means comprises a damping system comprising said pressure responsive diaphragm in said system operably connected to said disc and having an area under pressure substantially equivalent to an area of said valve disc under pressure, means to apply the same fluid controlled by said valve to said area of said pressure-responsive diaphragm in a direction for substantially equalizing pressure forces due to said fluid applied to said valve disc, whereby the attractive force necessary to be applied by said solenoid-type actuator for operating said valve disc is at substantially a minimum.

References Cited

UNITED STATES PATENTS

| 752,843 | 2/1904 | Kernohan | 251—138 X |
| 3,245,651 | 4/1966 | Erickson | 251—52 X |
| 3,140,073 | 7/1964 | Finck | 251—129 |
| 3,269,689 | 8/1966 | Lee | 251—52 |

FOREIGN PATENTS

| 1,360,443 | 3/1964 | France. |
| 19,690 | 1882 | Germany. |
| 1,145 | 1858 | Great Britain. |

ARNOLD ROSENTHAL, *Primary Examiner.*

U.S. Cl. X.R.

251—129